United States Patent [19]

Hagihara et al.

[11] Patent Number: 5,504,545
[45] Date of Patent: Apr. 2, 1996

[54] ILLUMINATING APPARATUS

[75] Inventors: Taro Hagihara, Ibaraki; Tsunemi Yoshino, Nara; Kazuoh Murata, Settsu, all of Japan

[73] Assignee: West Electric Company, Ltd., Osaka, Japan

[21] Appl. No.: 331,938

[22] Filed: Oct. 31, 1994

[30] Foreign Application Priority Data

Oct. 29, 1993 [JP] Japan .................. 5-272006

[51] Int. Cl.⁶ .................................. G03B 21/10
[52] U.S. Cl. .................. 353/74; 353/119; 362/97
[58] Field of Search .................. 353/74, 77, 78, 353/95, 120, 98, 99, 22, 23, 72, 119, DIG. 3; 362/33, 97, 98

[56] References Cited

U.S. PATENT DOCUMENTS 4,952,053  8/1990  Behr ........................... 353/98
5,152,600  10/1992  Boring ........................ 362/97
5,207,495  5/1993  Ahlstone ..................... 362/33
5,384,658  1/1995  Ohtake et al. ................ 362/33

Primary Examiner—William C. Dowling
Attorney, Agent, or Firm—Ratner & Prestia

[57] ABSTRACT

A compact illuminating apparatus for viewing films by transmitted light and having uniform light distribution across a diffusing plate, comprising a shallow elongated box-like main body having a base with a bottom having alternately arranged mountains and valleys walls or side parts of the box adapted to hold said diffusing plate; a frame arranged to close the box like base; a reflecting member having reflectance higher than that of said base and arranged on said bottom of said base; and an illuminating member comprising (1) light sources disposed below said diffusing plate, and (2) light-source-control member connected electrically with said light sources for controlling the operation thereof.

16 Claims, 3 Drawing Sheets

5,504,545

ILLUMINATING APPARATUS

BACKGROUND OF THE INVENTION

1. Field of the invention

This invention relates to illuminating equipment of a flat form, especially an illuminating device for illuminating transparent films for viewing the image recorded in the films.

DESCRIPTION OF THE PRIOR ART

Equipment to illuminate graphic films with pictures to be viewed are known. Such equipment comprise, in essence, illuminating means consisting of light sources, reflecting means, and diffusing plates working together as plain light sources.

The illuminating means, typically, was composed of a plurality of light sources such as straight bulb fluorescent lamps and a reflecting means consisting of mountainous parts and valley parts arranged alternately to surround the light source and to reflect the light toward the diffusing plate.

In the specification of U.S. Pat. No. 5,207,495 (incorporated herein by reference), for example, there is disclosed an illuminating device consisting of a diffusing plate, a light source of linear fluorescent lamps disposed under the diffusing plate, and a reflecting means consisting of mountain parts and valley parts (accordian shaped) arranged alternately with the mountain parts just under the lamps to reflect their light to the diffusing plate.

However, the distribution of light on the diffusing plate was far from uniform and the portions near the light sources were too bright while the other portions were dark, resulting in difficulty in viewing of the images on the graphic films placed on the diffusing plate.

To overcome such defects, an illuminating device with a long distance between the light source and the diffusing plate was proposed. However, such devices naturally resulted in large size.

SUMMARY OF THE INVENTION

The present invention comprises:

(a) a diffusing plate for diffusing incident light, (b) an illuminating means comprising (1) a light source disposed below the diffusing plate and (2) light-source-controlling means connected electrically with the light source for controlling the operation thereof to illuminate said diffusing plate, (c) a box-like main body having (1) a base comprising in combination, a bottom having alternately arranged, mountains and valleys, a side part or wall rising from the peripheral edges of the bottom and having an upper end to hold the diffusing plate, a container for receiving at least a part of the light-source-control means, and (2) a frame adapted to be placed and held at the circumference of said side part of said base, an opening of the frame defining the area of illumination of the diffusing plate, and (d) a reflecting means arranged on the bottom of the base and having reflectance higher than that of the base, to control the illumination of said diffusing plate.

Another example of the illuminating equipment according to the present invention comprises, further to the above structure, a graphic film with a picture recorded to be reviewed by light transmitted through the diffusing plate.

In the illuminating equipment constructed as described above, the light emitted by the light source is divided into two parts: one which proceeds directly to the diffusing plate and the other to the reflecting means. Of the light from the light source, the part that does not proceed to the under side of the diffusing plate is reflected by the reflecting means to be supplied to the under side of the diffusing plate, especially, between adjacent light sources. Therefore, the amount of the light proceeding directly to the diffusing plate and that of the light supplied to the plate after reflection are nearly equal.

As a result, even with a structure with the distance between the light source and the diffusing plate shortened, the diffusing plate can operate as a plain light-source with uniform illumination. Accordingly, a graphic film placed on the diffusing plate can be viewed entirely under favorable conditions.

DETAILED DESCRIPTION OF THE INVENTION

An example of an illuminating apparatus according to the present invention is explained below.

Figure 1:
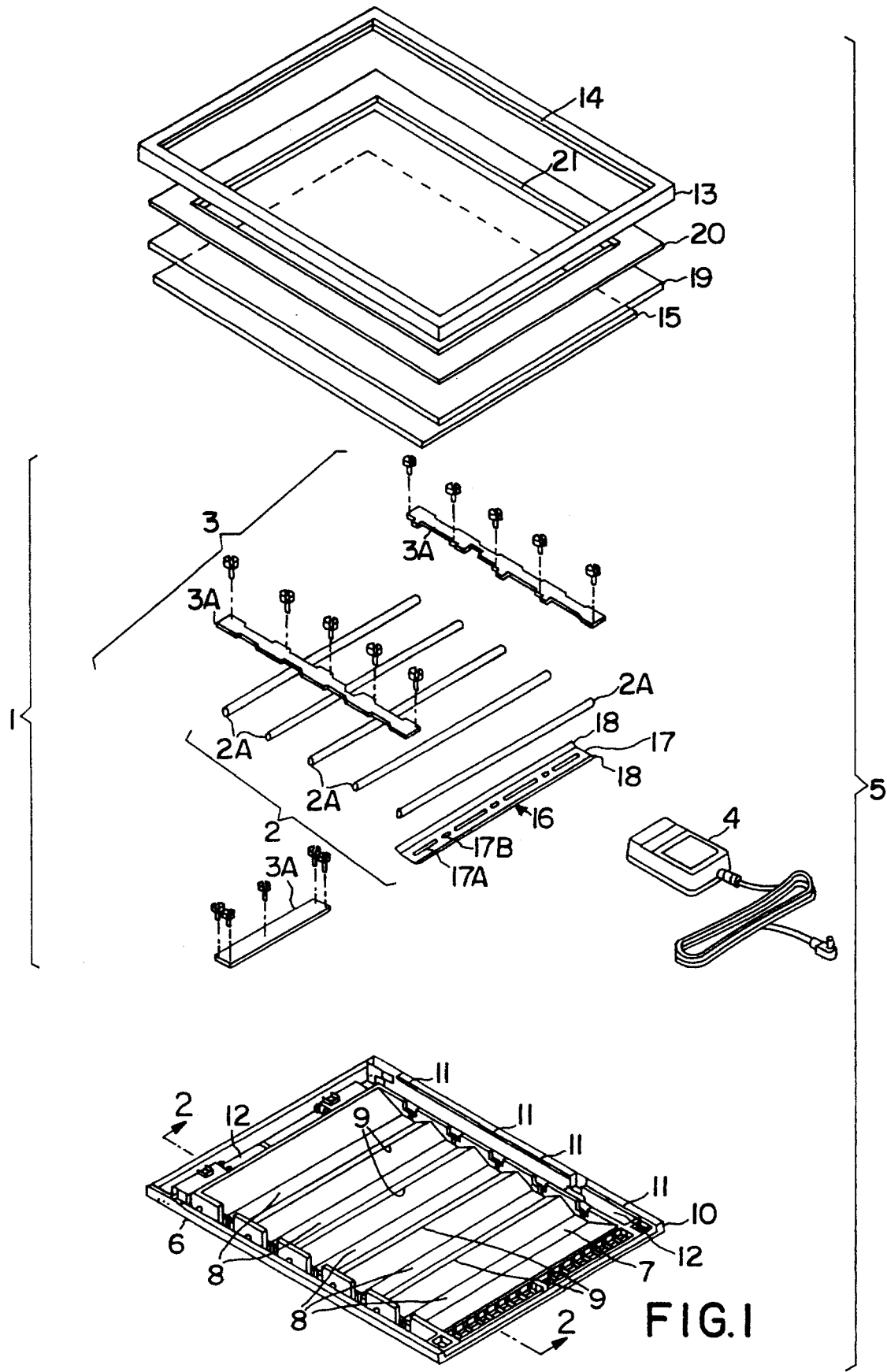
FIG. 1 is a perspective exploded view showing schematically an example of an illuminating apparatus according to the present invention.

Referring to FIG. 1, an example of the illuminating equipment according to the present invention, includes an illuminating means 1 consisting of a light source 2, and a light-source-control means 3 which includes a circuit substrate 3A and a power source adapter 4. The light source 2 comprises a plurality of straight fluorescent lamps 2A.

Figure 2:
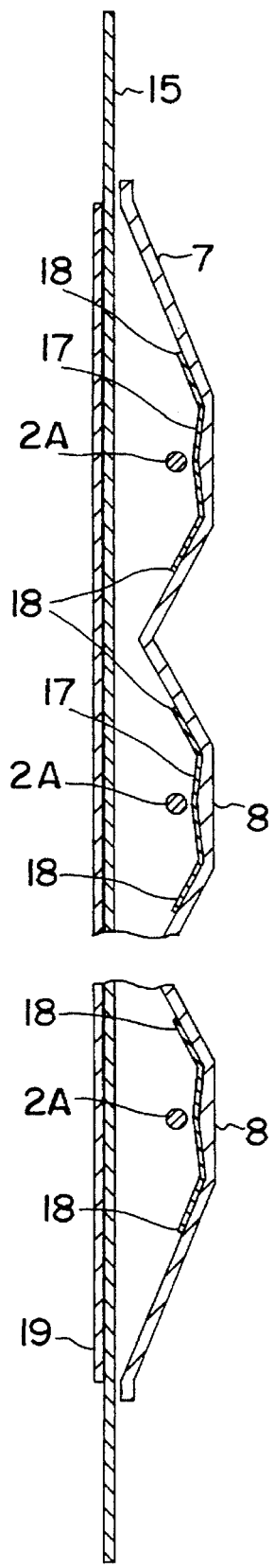
FIG. 2 is an enlarged partial sectional view showing schematically the section of the diffusing plate, reflecting means and light source of the illuminating apparatus taken along line 2—2 of FIG. 1.

A box shaped base 6 comprises a bottom portion 7 having valleys 8 and mountains 9 arranged alternately, side portion or peripheral wall 10 rising from the bottom portion 7 and having an upper end portion 11 provided with a groove for receiving an edge of a diffusing plate 15 which is explained later, and a container 12 formed at a fixed place for receiving the circuit substrate 3A of the light-source-control means 3. The fluorescent lamps 2A are arranged in the valley 8. As shown in FIG. 2, valley 8 extends in the direction of the straight fluorescent lamp 2A and forms a mountainous shape with sloping portions with the peaks just under the fluorescent lamps 2A.

The frame 13 having an opening 14 is disposed around the circumference of wall 10 of the base 6 in order to limit the illuminated area of the diffusing plate 15 which is explained later. The main body 5 consists of the base 6 and the frame 13. The diffusing plate 15 is disposed and held in the groove at the upper end 11 of the base 6. The diffusing plate 15 is transparent but diffuses the light projected by the light source 2.

A reflecting means 16, consisting of a reflecting body with a reflectance higher than that of the material of the base 6, is arranged at a part of the bottom portion 7 of the base 6 to control illumination of the diffusing plate 15 by the illuminating means 1. The reflecting means 16 consists of a first reflecting member 17 and a second reflecting member 18, the first reflecting member 17 having reflectance higher than that of the material of the base 6 and the second reflecting member 18 having reflectance higher than that of the material of the base 6 but lower than that of the first reflecting member 17 and being arranged in the bottom 7 as shown in FIG. 2. For example, if the base is formed of a white resin, the reflectance is about 85%. Therefore, the first 17 and the second 18 reflecting members are formed so as to have about 93 to about 97% and about 90% reflectance respectively. The first 17 or second 18 reflecting members may be effected by using an aluminum tape.

Further, in order to control the reflection, the first reflecting member 17 is disposed just under the light source 2, with a first opening 17A and a second opening 17B, both being rectangular but of different lengths with their longer sides parallel to the light source. The second reflecting member 18 is disposed on the side or slope of the mountain 9.

Although, in FIG. 1, only one reflecting means 16 is shown under a fluorescent lamp 2A, similar reflecting means 16 in accord with the invention are arranged, under all other fluorescent lamps 2A. Also, the first hole 17A and the second hole 17B are made larger or smaller according to various factors such as the distance between the light source 2 and the diffusing plate 15, diffusion of the diffusing plate 15, or reflectance of the reflecting means 16.

The graphic film 19 which has a picture to be viewed by the transmitted light is disposed on the upper surface of the diffusing plate 15.

A paper frame or mat 20 placed on the graphic film 19 has an opening 21 to define the size of the image to be viewed in the picture recorded on the film 19. The graphic film 19 and the paper frame 20 are pressed and held between the diffusing plate 15 and the frame 13.

Referring to FIG. 2, it is clear that the fluorescent lamps 2A forming the light source 2 are arranged just above the center of the valleys 8 which form the bottom 7 of the base 6, and the valleys 8 are formed as part of a low mountainous shape with the valley just under the light source 2. That is, the light source 2 is placed just above the middle of the valley part 8, and the first reflecting members 17 which form part of the reflecting means 16 are disposed on this valley part 8, while the second reflecting members 18 which form the other part of the reflecting means 16 are placed on a part of the slope or sides which form the mountain 9.

The graphic film 19 in which a picture is recorded is disposed above the light source 2.

As shown in FIG. 1, the apparatus includes the main body 5 consisting of the base 6 and the frame 13, the transmission type graphic film 19, the diffusing plate 15, a part of the illuminating means 1, and the reflecting means 16. In this embodiment, the graphic film 19 is not necessarily required.

When the light-source-control means 3 is connected through the power source adapter 4 to a power source (not shown) the lights 2A are illuminated. Of the light from the light source 2, a part proceeds directly to the under side of the diffusing plate 15 and another part is projected to the bottom 7, where it is reflected. With a structure as shown with the first reflecting member 17 disposed over most of the surface of the valley 8, most of the light reflected by the first reflecting member 17 proceeds to the mountain 9 to be reflected there. Thus, the mountain part 9 is supplied with two light sources: one projected directly from the source 2 and the other reflected by the first reflecting member 17.

Most light supplied to the under side of the diffusing plate 15 is reflected by the second reflecting member 18 and the base 6 itself. In this case, most of the light reflected by the second reflecting member 18 and the base 6 proceeds naturally, not to the part of the diffusing plate 15 facing the light source 2, but to the part facing to the mountain part 9, i.e. in the middle of two adjacent lamps. As a result, the part of the diffusing plate 15 between the adjacent lamps which was apt to be dark or gloomy in prior art devices becomes bright.

Thus, of the light projected by the light source 2 the part which does not proceed directly to the under side of the diffusing plate 15 is reflected by the reflecting means 16 which has a reflectance higher than that of the material of the base 6, and is supplied to the part of the diffusing plate 15 between adjacent light sources 2A.

Thus, compared with the conventional equipment reflection by the material of the base 6 only, the amount of the light supplied to the under side of the diffusing plate 15 is increased. Also, the diffusion of the light supplied to the under side of the diffusing plate 15 is easily controlled by the reflectances of a plurality of reflectors, so diffusion is better than that obtained in the conventional equipment with a limited reflectance of the material of the base 6. As a result, even in a structure with the distance between the light source 2 and the diffusing plate 15 shortened, a favorable amount of diffused light is supplied to the diffusing plate 15.

Therefore, the direct light from the light source 2 and the light reflected by the reflecting means 16 are supplied to the diffusing plate 15, causing uniform distribution of illumination of the diffusion plate 15; resulting in an improved light source.

A graphic film 19 put on the diffusing plate 15 is illuminated by the plate 15 with the above described favorable characteristics and the picture (image) in the film 19 can be more effectively viewed.

Figure 3:
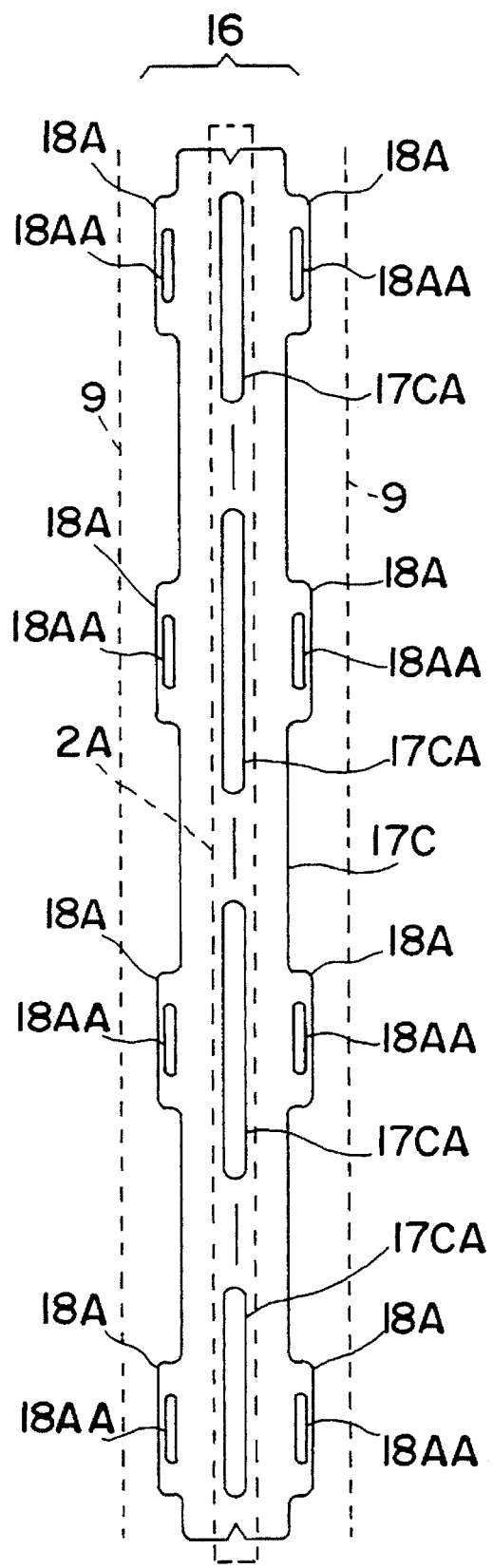
FIG. 3 is a plan view of another example of the reflecting means according to the present invention.

Referring to FIG. 3, there is shown another example of the reflecting means 16 for the illuminating equipment of the present invention. The first reflecting member 17C disposed at the valley 8 of the bottom 7 has holes 17CA, while four second reflecting members 18A each with hole 18AA are disposed on each side of the reflecting member 17C at intervals throughout the length as shown in the drawing.

The reflectances of the first reflecting member 17C and the second reflecting member 18A are equal to each other, and are larger than that of the material of the base 6. Also, the first hole 17CA and the second hole 18AA may be omitted, depending on the distance between the light source 2 and the diffusing plate 15, the diffusivity of the diffusing plate 15, the reflectance of the reflecting means 16 or other conditions. Further, the first reflecting member 17C and the second reflecting member 18A may be formed in one body.

Figure 4:
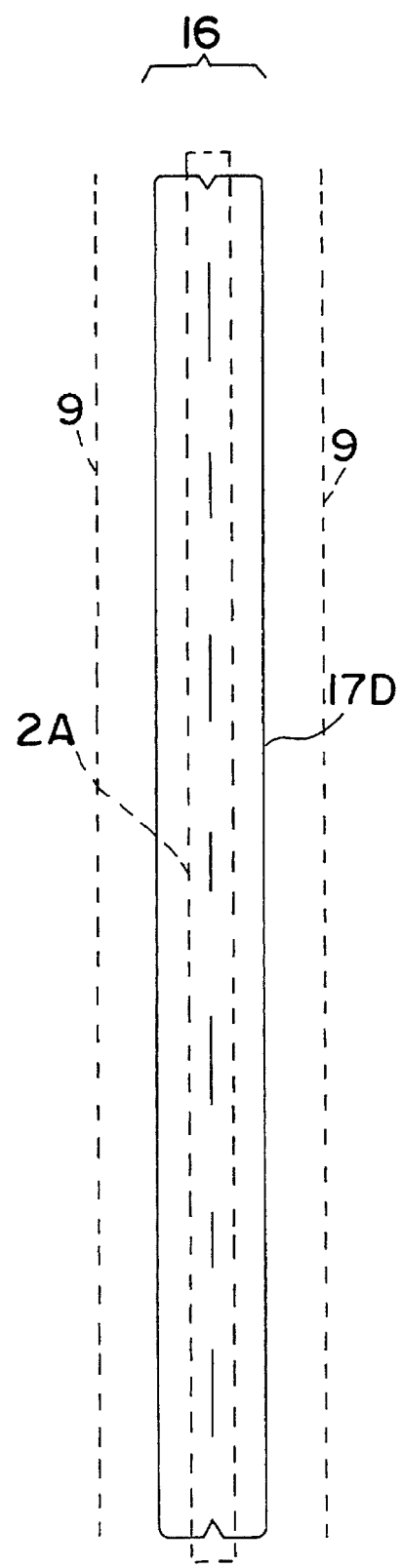
FIG. 4 is a plan view of still another example of the reflecting means according to the present invention.

The reflecting means 16 can be formed as a simple reflecting member 17D as shown in FIG. 4. The material for reflecting member 17D is a tape of aluminum. The member 17D may be provided with an adequate hole (not shown) just below the fluorescent lamp 2A as already shown by the reflecting members 17 and 17C in FIG. 1, and FIG. 3.

In an illuminating apparatus with the reflecting means 16 as shown in FIG. 3, a part of the light emitted by the light source 2 which does not proceed directly to the under side of the diffusing plate 15 is reflected by the first reflecting member 17C in the valley 8, by partial reflection by the second reflecting member 18A on the part of the mountain 9 to the valley, and by reflection on the part of the mountain 9, where the second reflecting member 18A is missing, and supplied to the part of the under side of the diffusing plate 15 between adjacent light sources 2.

In an illuminating apparatus with the reflecting means 16 as shown in FIG. 4, a part of the light emitted by the light source 2 which does not proceed directly to the under side of the diffusing plate 15 is reflected by reflecting member 17D on the valley 8, and by the reflection of the sloping plane (side) of the mountain 9, to be supplied to the under side of the diffusing plate 15 between adjacent light sources 2.

In an illuminating apparatus with the reflecting means shown in FIG. 4, the number of the paths of the light not directly proceeding to the diffusing plate 15 are not many compared to the other examples. However, a practical illuminating apparatus, as compared with conventional equipment as a satisfactory light source can be obtained, provided various conditions, for example, the distance between the light source and the diffusing plate 15, the diffusivity of the diffusion plate 15, the reflectance of the reflecting means 16 and so on are considered.

In an illuminating apparatus with the reflecting means as shown in FIG. 3 and FIG. 4, the light emitted by the light source 2 to be supplied to the under side of diffusing plate is reflected by the reflecting means 16 having reflectance higher than that of the material of the base 6. Therefore, compared with conventional equipment having reflection only from the material of the base, the amount of the light provided to the under side of the diffusing plate 15 is increased. Further, as the diffusion of light is controlled by a plurality of reflections, the diffusion of the light supplied to the under side of the diffusing plate 15 is more favorable as compared with conventional equipment with only the reflection provided by the material of the container.

As a result, if the distance between the light source 2 and the diffusing plate 15 is shortened, the amount of light is diffused with uniform illumination resulting in an excellent surface-light-source. A graphic film 19 placed on the diffusing plate 15 is illuminated thereby and viewed under more favorable conditions.

As explained above, in the illuminating equipment according to the present invention, part of the light emitted from the light source but not directed to the under side of the diffusing plate, is reflected by various surfaces with various reflectances, and supplied to the part of the under side of the diffusing plate between the light sources. Therefore, the supply of the light to the under side of the diffusing plate is controlled favorably in amount and diffusion. As a result, even with a structure with the distance between the light source and the diffusing plate shortened, the diffusing plate can be operated as a plain light source with uniform illumination.

Thus, an illuminating device with a plain light source which is thin and uniform in illumination can be realized, by shortening the distance between the light source and the diffusing plate. Also, by placing a graphic film containing an image on the diffuser plate the film can be viewed more effectively.

What is claimed:

1. An illuminating apparatus comprising;
   (a) a diffusing plate for diffusing incident light,
   (b) an illuminating means comprising
      (1) at least one light source disposed below said diffusing plate and
      (2) light-source-controlling means for controlling operation of said at least one light source,
   to illuminate said diffusing plate by supplying the light emitted by said at least one light source,
   (c) a main body comprising
      (1) a base comprising a bottom having
         (i) alternately arranged mountains and valleys,
         (ii) a side part rising from edges of said bottom and having an upper end to hold said diffusing plate, and
         (iii) a container for receiving at least a part of said light-source-controlling means, and
      (2) a frame adjusted to be placed at the circumference of said side part of said base to receive and hold said base, said frame having an opening defining the area of illumination of said diffusing plate, and
   (d) reflecting means arranged on said bottom of the base and having reflectance higher than that of said base, to control the illumination of said diffusing plate.

2. An illuminating apparatus according to claim 1, wherein said at least one light source is a plurality of straight tube fluorescent lamps.

3. An illuminating apparatus according to claim 1, wherein said reflecting means is a reflecting member covering all of the surface of the valley of said bottom.

4. An illuminating apparatus according to claim 1, wherein said reflecting means comprises a first reflecting member arranged in said valley of said base and a second reflecting member having reflectance lower than that of said first reflecting member being arranged on a sloping part of said mountain.

5. An illuminating apparatus according to claim 4, wherein said first reflecting member has holes with different lengths disposed in line with said light source.

6. An illuminating apparatus according to claim 1, wherein each of said valleys is mountain shaped with a peak, said peak of each of said valleys is respectively disposed under a respective one of said at least one light source.

7. An illuminating apparatus comprising:
   (a) a diffusing plate for diffusing incident light,
   (b) a graphic film for review arranged on said diffusing plate,
   (c) an illuminating means comprising
      (1) light sources disposed below said diffusing plate and
      (2) light-source-control means for controlling operation of said at least one light source,
   (d) a main body comprising
      (1) a base comprising a bottom having alternately arranged mountains and valleys, a side part rising from the end of said bottom and having an upper end to hold said diffusing plate and said graphic film, and a container for receiving at least a part of said light-source-controlling means, and
      (2) a frame adjusted to be placed at the circumference of said base to receive and hold said base, said frame having an opening defining the area of illumination of said diffusing plate, and
   (e) reflecting means arranged on said bottom of the base and having reflectance higher than that of said base.

8. An illuminating apparatus according to claim 7, wherein said light sources are a plurality of straight tube fluorescent lamps.

9. An illuminating apparatus according to claim 7, wherein said reflecting means is a reflecting member disposed over the surface of the valley of said bottom.

10. An illuminating apparatus according to claim 7, wherein said reflecting means comprises a first reflecting member arranged in said valley of said base and a second reflecting member having reflectance lower than that of said first reflecting member being arranged on a sloping part of said mountain.

11. An illuminating apparatus according to claim 10, wherein said first reflecting member has holes with different lengths disposed in line with said light sources.

12. An illuminating apparatus according to claim 7, wherein each of said valleys is mountain shaped with a peak, said peak of each of said valleys is respectively disposed under a respective one of said at least one light source.

13. An illuminating apparatus comprising;
 (a) a diffusing plate for diffusing incident lights;
 (b) an illuminating means comprising
  (1) at least one light source disposed below said diffusing plate, and
  (2) light-source-controlling means for controlling operation of said at least one light source,
 (c) a main body comprising
  (1) a base comprising a bottom having alternately arranged mountains and valleys, a side part rising from edges of said bottom and having an upper end to hold said diffusing plate, and a container for receiving at least a part of said light-source-controlling means, and
  (2) a frame adapted to be placed at the circumference of said base to receive and hold said base and said frame having an opening defining the area of illumination of said diffusing plate, and
 (d) a reflecting means comprising
  (1) a first reflecting member having reflectance higher than that of said base and being disposed in said valley of said bottom of said base, and
  (2) a second reflecting member having reflectance substantially equal to that of said first reflecting member and being disposed on said mountain of said bottom of said base, to control the illumination of said diffusing plate.

14. An illuminating apparatus according to claim 13, wherein said first reflecting member is disposed over the entire surface of said valley of said bottom, and said second reflecting member is arranged on a sloping part of the surface of said mountain of said bottom.

15. An illuminating apparatus according to claim 13, wherein each of said valleys is mountain shaped with a peak, said peak of each of said valleys is respectively disposed under a respective one of said at least one light source.

16. An illuminating apparatus according to claim 13, further comprising:
 (e) a film having an image to be viewed, said film arranged on said diffusing plate.

* * * * *